Oct. 28, 1941.  J. W. KITTREDGE  2,260,855
POULTRY PLUCKER
Filed June 17, 1938  5 Sheets-Sheet 1

Inventor:
John W. Kittredge
By Nock & Blum
Attorneys.

Oct. 28, 1941.   J. W. KITTREDGE   2,260,855
POULTRY PLUCKER
Filed June 17, 1938   5 Sheets-Sheet 2

Inventor:
John W. Kittredge
Mock & Blum
Attorneys.

By

Oct. 28, 1941.    J. W. KITTREDGE    2,260,855
POULTRY PLUCKER
Filed June 17, 1938    5 Sheets-Sheet 3

Inventor.
John W. Kittredge
By Mock + Blum
Attorneys

Oct. 28, 1941.          J. W. KITTREDGE          2,260,855
                         POULTRY PLUCKER
                    Filed June 17, 1938          5 Sheets-Sheet 4
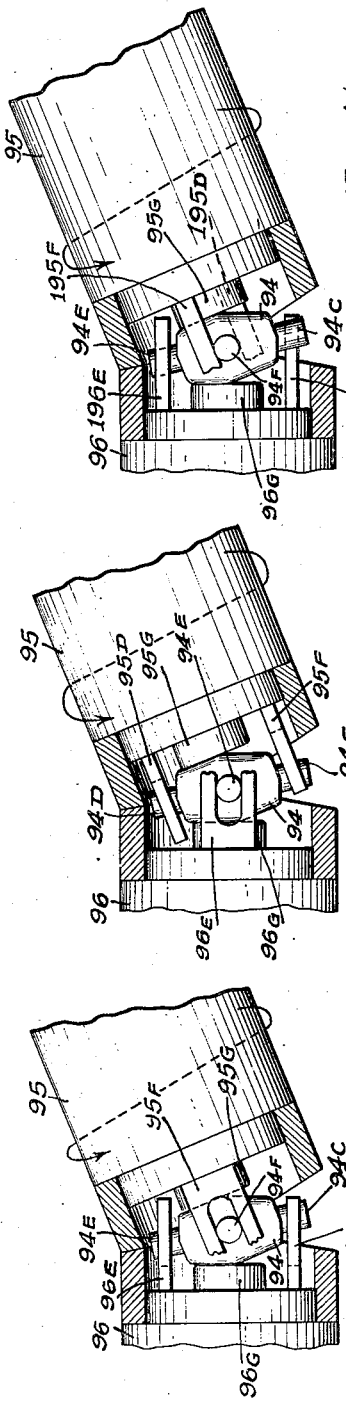
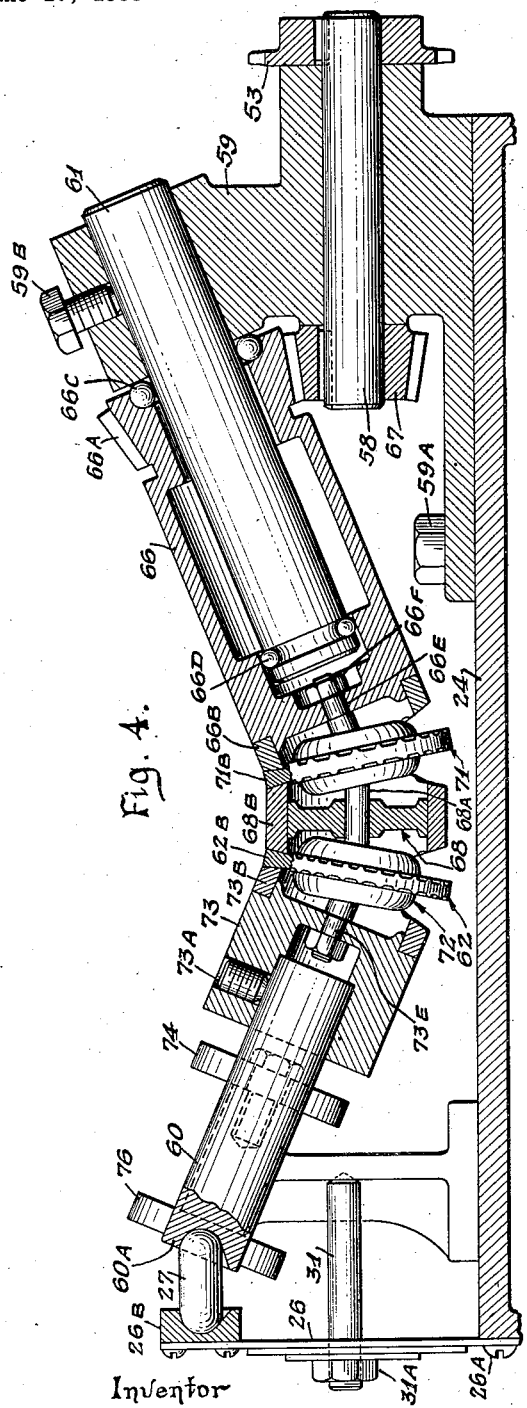
Inventor
John W. Kittredge
By  Mock & Blum
        Attorneys.

Oct. 28, 1941.         J. W. KITTREDGE         2,260,855
                        POULTRY PLUCKER
              Filed June 17, 1938         5 Sheets-Sheet 5

Inventor:
John W. Kittredge
By Mock & Blum
Attorneys.

Patented Oct. 28, 1941

2,260,855

UNITED STATES PATENT OFFICE 2,260,855

POULTRY PLUCKER

John W. Kittredge, New York, N. Y., assignor to Mechanical Plucker Corporation, New York, N. Y., a corporation of New York Application June 17, 1938, Serial No. 214,196

9 Claims. (Cl. 17—11.1)

My invention relates to a poultry plucker in which the skin of the fowl is held back against the action of plucking members by a plucking bar, and the feathers are gripped between plucking members pressed against each other in rolling contact, whereby the feathers are plucked from the skin.

Some of the objects of my invention are:

1. To have the plucking parts carried on accurately fitting bearings and joints, which can be easily lubricated.

2. To have a theoretical line contact between the rolling gripping or plucking members, in contrast to a point contact or a substantial surface contact, and to cause said members to operate continuously.

3. To provide means for exerting pressure between rolling plucking members and to cause them to grip the small pin feathers and also to move apart under regulated pressure so as to admit the large quills between said rolling plucking members.

4. To have a plucking bar hold back the flesh or skin of the fowl, while the gripping members pluck the feathers therefrom.

5. To have an exhaust fan pull the feathers away as the rolling plucking members release said feathers and to deposit the feathers uninjured in a bag or other suitable receptacle.

6. To have the casing of the device closed except for openings at the gripping members and at the bag, and to have an air current pull the feathers in between the plucking members.

7. To have a number of plucking members spaced at sufficient intervals along the machine and across the machine so that they will not exert sufficient pull at any place to tear the skin; and to have them so spaced laterally that as the fowl passes over them they will pluck a strip clean for several inches wide along said fowl.

8. To have the fowl rest on top of the machine while being plucked, so that the operator need not support the fowl.

9. To provide mechanical means to move the fowl forward as it is plucked and, at the same time, lift it slightly, so that as the operator moves it back to the starting point to pluck a second strip along it, he will be moving the fowl down hill, and he will have to do little or no lifting of the fowl.

10. To have the path of the fowl over the grippers trough-shaped or valley-shaped, so that there will be no tendency for the fowl to slip sideways.

11. To have the machine of proper height that the operator can stand or sit erect at his work.

12. To have all parts simple and easily accessible.

I attain these objects by the mechanism shown in the accompanying drawings, in which—

Fig. 4 is an enlarged sectional view on the line 4—4 of Fig. 3, but showing parts omitted in Fig. 3 and which would be intersected by line 4—4 of Fig. 3, if not omitted from that figure.

Figs. 9 and 10 are diagrammatic views of a modification of the invention in which the coacting gripper members are smooth as contrasted with those of Fig. 4 and in which auxiliary coupling means are employed, the members being shown partially in section, Fig. 10 showing the coupling means as rotated ninety degrees from the position of Fig. 9.

Fig. 11 is a diagrammatic view of a modification of the invention similar to that of Figs. 9 and 10 but in which the coupling means differs from those of Figs. 9 and 10.

Figure 14:
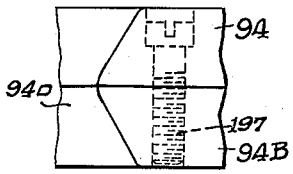
Figure 13:
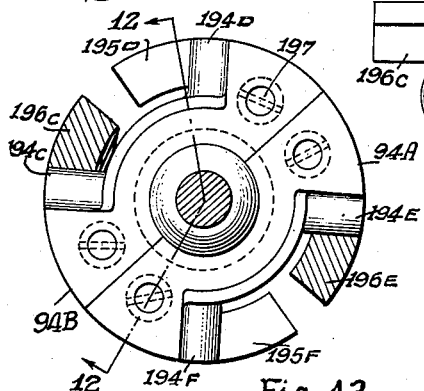
Figure 12:
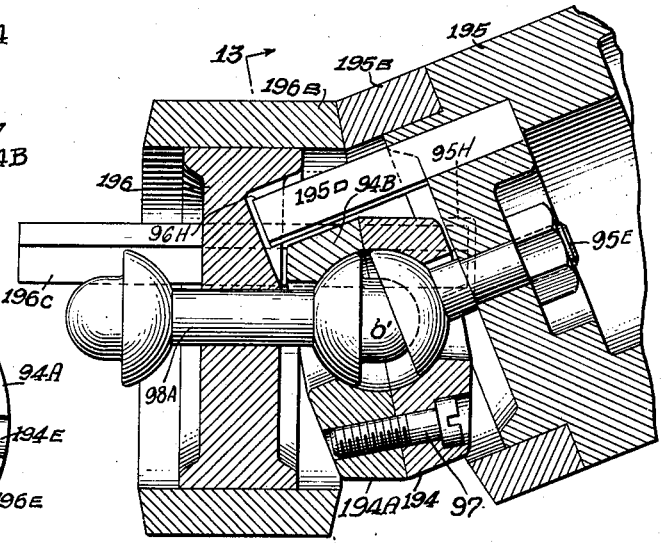

Figs. 12, 13 and 14 show enlarged views of details of a modification of the invention in which the coacting gripping members are like those shown in Figs. 9, 10 and 11, but the coupling means are of different form. Fig. 12 shows a sectional view of a pair of coacting gripping means and their coupling means. Fig. 13 is a sectional view along the line 13—13 of Fig. 12, certain parts being omitted, and showing chiefly the hub and associated driving elements. Fig. 14 is a top view of the hub of Fig. 13.

Fig. 14 is a top view of the hub which is shown in Fig. 13.

The frame of the mechanism comprises a substantially horizontal table 24. The sides of this table 24 are connected to frame members 22 and 23 whose bottoms rest upon a floor or other suitable foundation. The frame also includes vertical members 20 and 21 which abut the underside of the table 24. The bottom ends of the frame members 20 and 21 are spaced above the bottom ends of the frame members 22 and 23.

The table 24 and the vertical members 20, 21, 22 and 23 are connected in any suitable manner as for example by means of bolts 24A.

The casing of the motor 25 is bolted to the frame member 23 by means of bolts 25A. The drive shaft 28 is connected at one end to the motor shaft 25B, by the coupling 29. Near its other end said drive shaft 28 is supported in a bearing 30, which is connected to the bottom edge of the frame member 21, by bolts 30A. The pulley 32 is keyed to the drive shaft 28.

Figure 2:
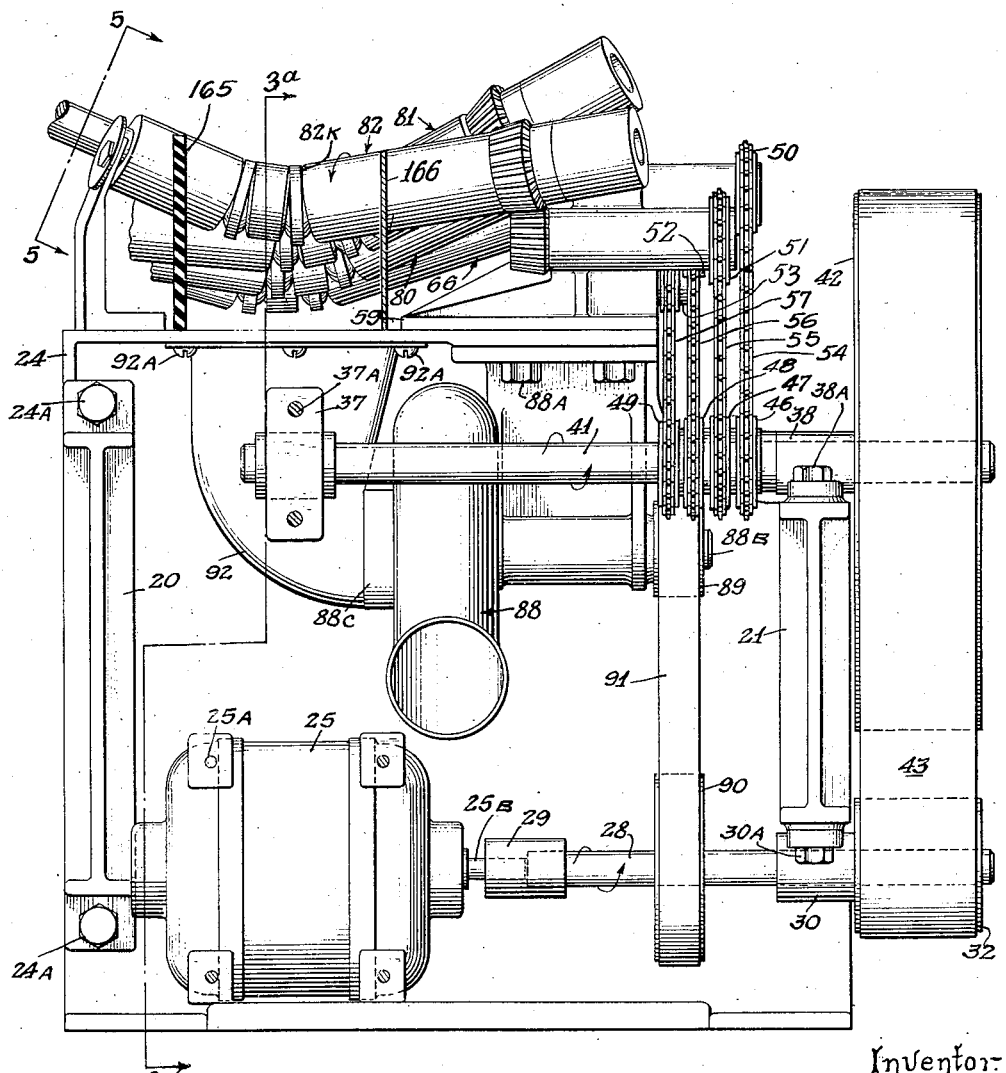
Fig. 2 is a vertical sectional view, partially in elevation, on the line 2—2 of Fig. 1 and it is also taken on the line 2a—2a of Fig. 3. The scale of Fig. 2 is less than Fig. 1.
Figure 3:
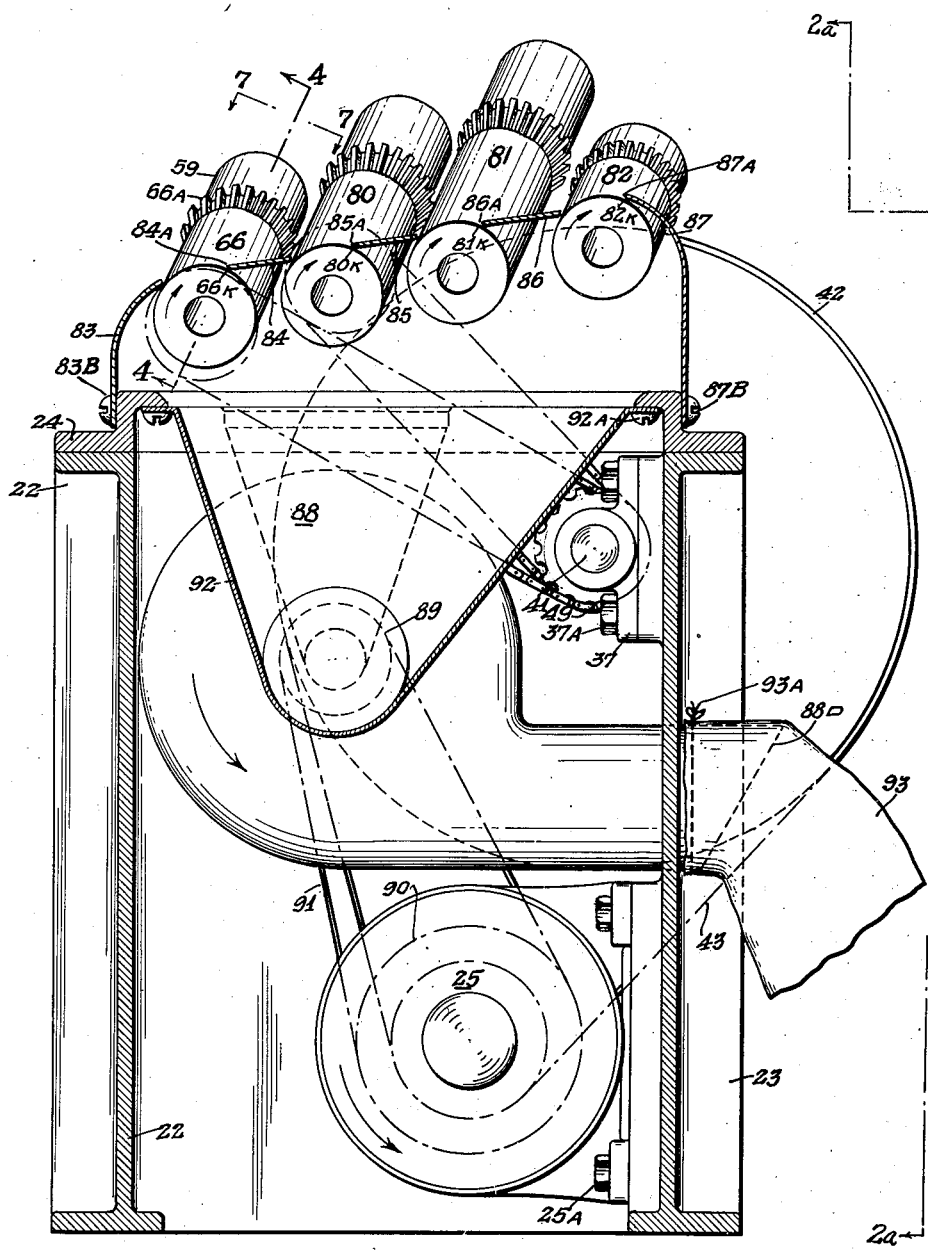
Fig. 3 is a vertical view on line 3—3 of Fig. 1 and also on the line 3a—3a of Fig. 2.

As shown in Figs. 2 and 3, bearing 37 is rigidly connected to frame member 23 as by bolts 37A. As shown in Fig. 2, bearing 38 is rigidly connected by bolts 38A to a shouldered portion of the top edge of frame member 21, which extends beyond table 24.

These bearings carry jack shaft 41. Jack shaft 41 has large pulley 42 keyed thereto, and this pulley is driven from drive shaft 28 and pulley 32 by belt 43. Jack shaft 41 carries sprockets 46, 47, 48 and 49 rigidly connected thereto, and these drive the sprockets 50, 51, 52 and 53 (shown in Fig. 1) through chains 54, 55, 56 and 57 respectively.

As shown in Fig. 4, sprocket 53 is carried on horizontal shaft 58 and said sprocket is keyed to said shaft. Bearing bracket 59 is rigidly connected to table 24 by bolts 59A. This bearing bracket carries horizontal shaft 58 rotatable therein, and said bracket also carries stud or spindle 61 fixed rigidly in a bore thereof by setscrew 59B. Sleeve 66 is turnably mounted on spindle 61, preferably by a ball bearing, such as a combined radial and thrust bearing 66C which is shown at the right of Fig. 4, and a radial bearing 66D located in spindle 61 at the left end thereof, where strength is not required.

Integral with or rigidly connected to sleeve 66 is bevel gear 66A, which is driven by bevel gear 67 on shaft 58. Gripper member 66B, preferably of hardened steel, is rigidly connected or keyed to the end of sleeve 66, so that sleeve 66 operates as a gripper sleeve.

Figure 6:
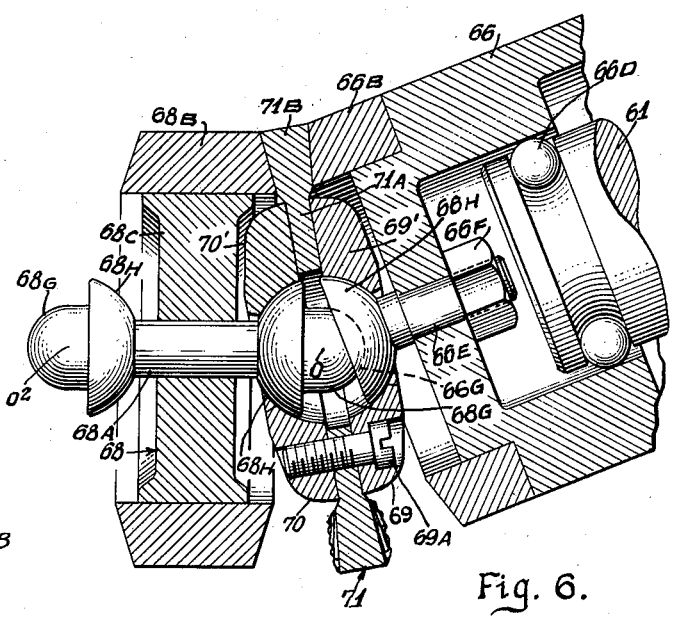
Fig. 6 is an enlarged sectional view of one of the joints shown in Fig. 4.

As shown in Fig. 4, the lower left-hand end of sleeve 66 is provided with a shoulder having an annular surface whose plane is perpendicular to the longitudinal axis of said sleeve 66. Gripper member 66B has a planar annular surface which abuts said annular surface of sleeve 66. The inner wall of gripper flange 66B is cylindrical and a part of said wall has a drive fit on the adjacent cylindrical surface of sleeve 66. The gripping or free left-hand surface of gripper member 66B is annular and the radial elements thereof converge to the common point O which is shown in Fig. 6. Said gripping surface is therefore an annulus of a cone whose vertex is at the point O.

Said free surface of gripper member 66B is corrugated along lines which meet at point O, as will be later more fully described.

Ball-head bolt 66E (see Fig. 6) is connected rigidly to the end wall of gripper sleeve 66 by nut 66F. This bolt 66E has a head which is a segment of a sphere.

This head has convex surface 66H and a concave socket-surface 66G.

Intermediate gripper element 68, which is preferably symmetrical (see Fig. 6), has a central spindle 68A, a web 68C which is preferably cast integral with said spindle, and a gripper member 68B, preferably made of hardened steel, and connected rigidly to the web 68C.

As shown in Fig. 6, the cross-section of each gripper member 68B is frusto-conical. If the inclined lateral lines of said cross-section were elongated, said elongated lines would pass through points O and $O^2$. These members 68B are also corrugated along linear elements of their respective conical surfaces, which are designated in Fig. 6 by said lateral inclined lines.

A head on each end of the spindle 68A has a spherical or ball surface 68H adjacent the web 68C, and a spherical or ball surface 68G remote therefrom. Each of said surfaces 68H and 68G is a portion of the surface of a sphere.

One of the ball ends 68G fits in the corresponding socket 66G of bolt 66E. Lock members 69, 69' and 70 and 70', which have sockets corresponding to ball surfaces 66H and 68H, fit around said ball surfaces with sufficient clearance for a running or free-turning fit. Said lock members 69 and 70 hold between them gripper disc 71, and the lock members 69 and 70 and gripper disc 71 are held rigidly together by screws 69A.

Obviously part 70' must be made separate from part 70 in order to assemble said parts with the adjacent head 68H. Members 69 and 69' may be integral. Member 70' is held in position by any conventional means. Gripper disc 71 has central web 71A and gripper flange 71B. The longitudinal elements of the lateral frusto-conical surfaces of flange 71B converge to point O.

This combination provides a joint which is of the ball-and-socket type, but which cannot compress nor pull apart. The surfaces whose longitudinal elements meet at point O thus roll together correctly with theoretical line contact, corresponding to the rolling action of symmetrical conical abutting surfaces. When they are pressed hard together, they can grip between them the feathers of a fowl and, as they turn, they pull the feathers out. The cooperating surfaces of members 66B, 71B and 68B thus have theoretical line contact, which becomes a small surface contact as the metal parts are compressed under pressure.

A second joint 72 which is shown in Fig. 4 is a duplicate of the joint just described, and it connects intermediate gripper member 68 to tightener gripper member 73 with gripper disc 62 therebetween. Member 73 has bolt 73E and gripper flange or member 73B corresponding to bolt 66E and gripper flange or member 66B. Member 73 has shaft 60 connected rigidly thereto, as by set-screw 73A, so that shaft 60 and member 73 turn in unison.

As shown in Fig. 4, a spring, such as leaf spring 26, is connected to table 24 by screws 26A, and said spring 26 carries socket member 26B. Intermediate member 27 rests in socket member 26B and in a corresponding socket 60A in the end of shaft 60. Shaft 60 can turn freely relative to member 27. Through said member 27, spring 26 exerts longitudinal pressure on shaft 60 and on the abutting rolling surfaces of members 73B, 62B, 68B, 71B and 66B, in order to make said surfaces grip the feathers, and pull them out of the skin of the fowl.

The spring 26 causes said rolling surface to grip the pin feathers and pull them out, without any substantial separation between said rolling surfaces. When a large quill or quills enter between any adjacent pair of said rolling surfaces, the spring 26 yields so as to permit said rolling surfaces to separate sufficiently to grip the large quill and pull it out. The assembly is maintained even if the rolling surfaces separate so as to operate on a large quill or quills.

The pressure of spring 26 can be adjusted by means of bolt 31 and nut 31A. The end of bolt 31 is secured to or it abuts a stationary frame member. If the direction of the pressure applied by the member 27 is parallel to the outer cylindrical surface of flange 68B, as shown in Fig. 4 by line L, then the pressure on all the gripping joints is equal.

The axes of revolution of members 60, 73, 62, 68a, 71 and 66 are in the same plane. The axes of member 60 and of member 66 are respectively equally inclined to the axis of member 68A. These equal angles are preferable, but not necessary, and the invention is not limited thereto.

Figure 1:
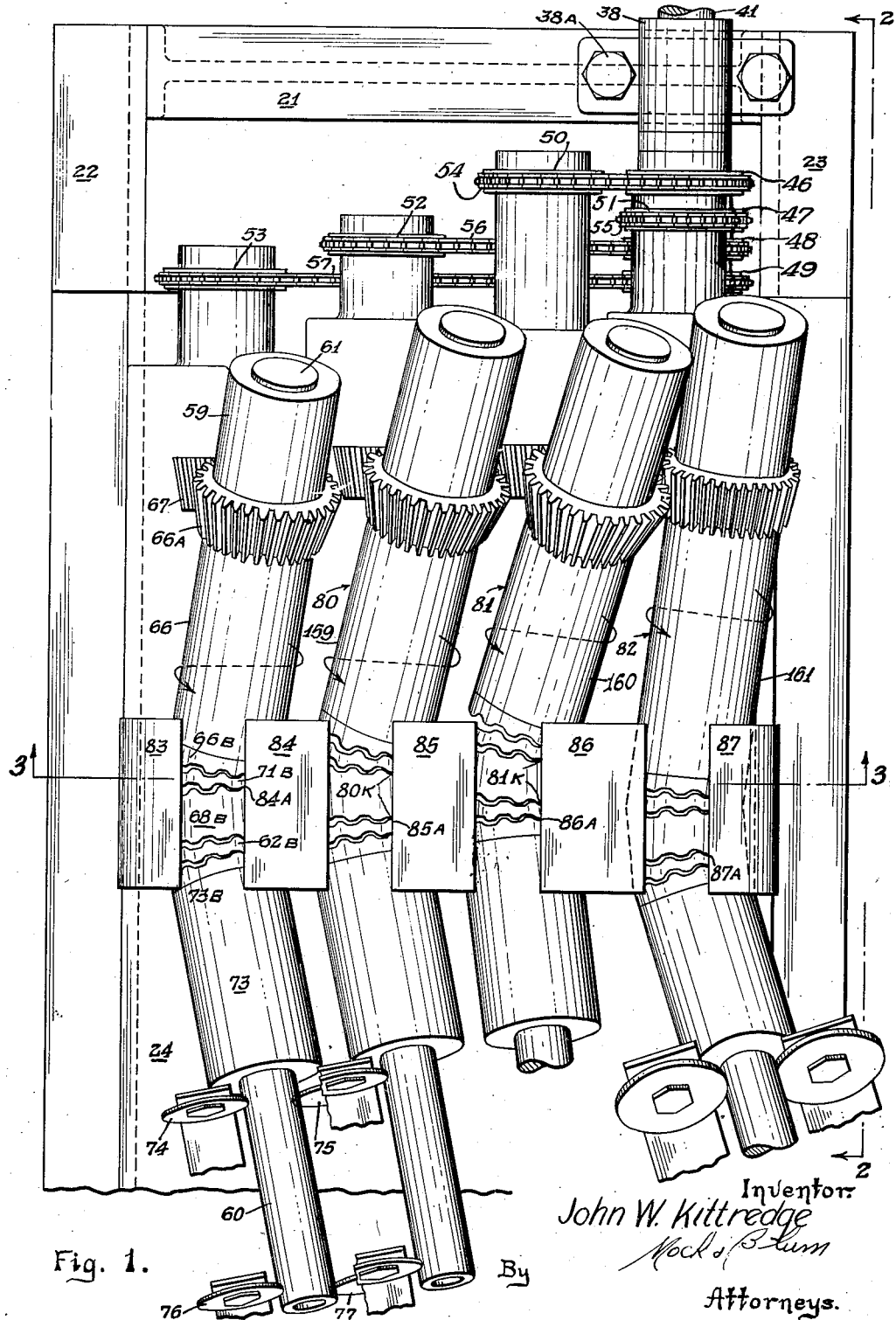
Fig. 1 is a plan view of one embodiment of the invention, the representation of certain conventional parts having been omitted for the sake of clearness.
Figure 5:
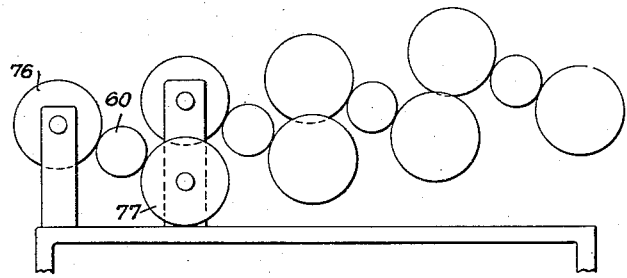
Fig. 5 is a diagrammatic view taken on the line 5—5 of Fig. 2.

The members 60, 66 and 68 are maintained in proper relative position by the spacer discs shown in Figs. 1 and 4. Shaft 60 is mounted between two pairs of turnable spacer discs 74 and 75, 76 and 77. The discs are turnably mounted on uprights which are connected to table 24. As the curves of the discs approximate straight lines for short distances near their points of contact with shaft 60, said discs permit a small up-and-down motion of shaft 60, while maintaining shaft 60 sufficiently close to the plane defined by the line 4—4 in Fig. 3. Shaft 60 turns between said turnable spacer discs.

Figures 7, 8:
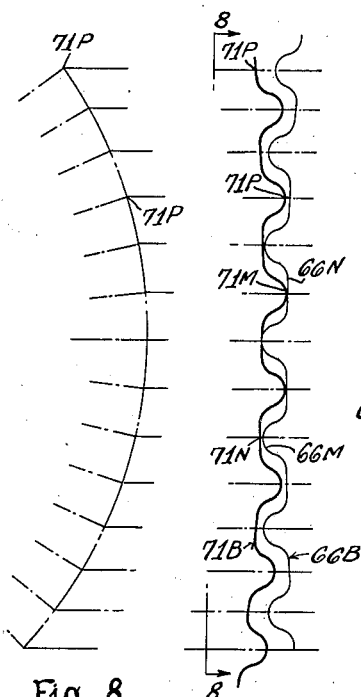
Fig. 7 is an enlarged partial view of a pair of coacting gripper members, members 66B and 71B being represented as typical, the member 66B being shown in side view, and the member 71B being slightly tilted from the plane of a side view.
Fig. 8 shows a part of the common pitch circle of the members which are shown in Fig. 7, being taken on the line 8—8 of Fig. 7.

In order to drive the consecutive members 71, 68, 62 and 73 by the rotating gripper sleeve 66, the respective adjacent surfaces of said members are corrugated as shown in Figs. 7 and 8. The hills or projecting portions of the corrugations are thus analogous to the teeth of bevel gears, but there is a substantial difference. The hills 66M of member 66B abut the bottoms of the grooves 71N of gripper disc 71B, under heavy pressure, as previously explained. The hills 71M of said gripper disc 71B abut the bottoms of the grooves 66N of member 66B, also under heavy pressure. The feathers are gripped between the interfitting portions of these corrugations. The points 71P on the pitch arc of part 71B of Fig. 8 and on the outline of the teeth of part 71B of Fig. 7. 71B indicate the center lines of the hills and hollows which are shown in Fig. 7.

Figure 8 shows a part of the common pitch circle of the members which are shown in Figure 7 and being taken on the line 8—8 of Figure 7.

Therefore, the corrugations cannot fit closely like gear-teeth, or they would cut up the feathers, and the feathers would wedge and bind in the teeth. The corrugations are made about as illustrated but not as large as according to the scale of Fig. 7 herein, and they thus serve a double purpose. As shown in Fig. 7, the lateral walls of the corrugations are spaced from each other. Each rolling surface drives the adjacent rolling surface by means of the corrugations. Said corrugations provide much greater grip and pull on the feathers than smooth surfaces.

The series of rolling gripping surfaces just described with its drives, grippers, joints and tighteners is duplicated as at plucking units 80, 81 and 82 in Figs. 1, 2 and 3. Each plucking unit is driven by the shaft of one of the sprockets 50—53, by means of bevel gears like the bevel gears 67 and 66A.

This embodiment discloses four assemblies of gripping rolling surfaces. Each assembly is identical in construction and operation with the assembly previously described.

The sleeve 159 of unit 80, which corresponds to sleeve 66, has a greater inclination to the horizontal plane than said sleeve 66. Sleeve 160 of unit 81 has an even greater angle to said horizontal plane than sleeve 159. The axis of sleeve 161 of unit 82 makes a smaller angle with the horizontal plane than the axis of sleeve 66. As previously stated, the axes of members 66, 68A and 60 are in the same plane. The axes of the corresponding members of each unit 80, 81 and 82 are also respectively located in respective common planes which are preferably parallel to the first-mentioned plane. This is shown in Fig. 3.

The axes of the sprockets 50, 51, 52 and 53 are horizontal and parallel to each other. Each of the sprockets 50—53 respectively drives one of the plucking units. The angles of the bevel gears which drive the respective units are different, since the sleeves of the respective units are inclined at different angles to the horizontal plane, and all the shafts of said driven sprockets are horizontal.

The fowl which is to be plucked is moved from left to right in the plane of Fig. 3. The rolling plucking surfaces turn in the same direction so as to urge the fowl from left to right in Fig. 3, thus minimizing the labor of moving the fowl.

As shown in Fig. 3, the consecutive rolling and plucking surfaces are located at higher levels from left to right.

The weight of the fowl is supported on these rolling surfaces.

Assuming that a vertical line is passed through the common vertex of a pair of rolling and gripping surfaces, such as the point O in Fig. 6, said surfaces grip the feathers at a point which is spaced from said vertical line, in the direction of turning of the top edges of said rolling surfaces. Said gripping points are above the centres of their respective rolling surfaces. A series of gripping points 66K, 80K, 81K, and 82K of corresponding rolling surfaces of the different plucking units, is shown in Fig. 3. These gripping points are successively higher, as shown in Fig. 3.

The theoretical line contact between adjacent rolling surfaces, is clearly shown in Fig. 2.

The perpendicular or radial distance from the axis of member 68A, to the outer cylindrical surface of member 68B, is equal to the perpendicular or radial distance from the axis of sleeve 66 to the outer cylindrical surface of member 66B. The perpendicular or radial distance from point O to the outer surface of member 71B is greater than the effective radius of member 68B. Each of the lateral surfaces of member 71B therefore has one or more corrugations in excess of the number of corrugations of the adjacent surfaces of members 66B and 68B.

There is a suction device below the rolling and gripping surfaces, as will be hereinafter explained, and an air current is produced around the fowl and down into the openings between the rolling surfaces, and this air current pulls the feathers down into those openings. Then as the fowl moves forward, and as the tops of the rolls turn forwardly, the gripping rolling surfaces operate to grip the feathers at the point represented by the points 66K, 80K, 81K and 82K, in Fig. 3.

A series of plates 84, 85 and 86 are arranged between the rolling surfaces of the respective units, and an end plate 87 is also provided. The tops of the rolling surfaces tend to move the fowl forwardly (from left to right in Fig. 1), and the body of the fowl then slides on plates 84, 85 and 86, between the respective plucking units. The left edges as 84A, 85A and 86A of the plates 84, 85, and 86 are just above the respective gripping points 66K, 80K and 81K, and said edges function as the edges of plucking bars. These plates hold back the body and the skin of the fowl and, as the gripping surfaces turn forward with the feathers gripped tightly between them, said gripping surfaces pull the feathers out. The edge 87A of the last plate 87 serves as a plucking bar in a similar manner. After plucking the feathers, the gripping surfaces release the feathers.

The gripping surfaces of the respective units are offset laterally, or in a direction perpendicular to the movement of the body of the fowl relative to the machine, as shown in Fig. 1, so that as the body of the fowl is moved forwardly in a straight line from left to right in Fig. 1, every part of said body within the limits of the plucking members comes into engagements with one unit or another, and every part of the fowl within those limits is plucked. The air current pulls the feathers downwardly from a space somewhat wider than the effective plucking portions of the rolling surfaces. This causes a clean plucking action along a strip which is as wide as the maximum lateral spacing between the plucking units. The rolling surfaces of each unit are sufficiently far apart and the grips are sufficiently spaced along the units that the plucking is at small spaces over a considerable area, and the pull is not sufficient at any point to tear the skin. The rolling surfaces are offset as shown in Fig. 1 and are set at different slopes as shown in Fig. 2, so as to form a trough or valley along their center line with gripping flanges located laterally relative to said center line.

As shown in Fig. 2, a fan or blower 88 of ordinary type is fastened to member 24 as by screws 88A. Fan shaft 88B has pulley 89 keyed thereto, and this pulley is driven by belt 91 and by pulley 90 keyed to drive shaft 28. The bottom half of the hood 92 of a vacuum chamber is attached to member 24 by screws 92A. Member 24 is open, as shown in the Fig. 3. This hood 92 is connected to the suction side 88C of the fan. The plates 84, 85 and 86 above described, beside serving as plucking bars, form spaced parts of the top of the vacuum chamber. Plates 83 and 87 form side walls of the vacuum chamber, and they are attached to frame piece 24 as by screws 83B and 87B. The tops of the rolls are exposed and they project above the top of the vacuum chamber as shown. Said vacuum chamber is built around said rolls, and the walls 165 and 166 of said chamber which abut the tightener roll 73 and other tightener rolls of the units must be of rubber or other flexible material to allow the rolls 73 and the like to shift as permitted by spring 26, the wall 166 is of a material different from that of wall 165 and preferably is of metal.

The openings through which the air enters the vacuum chamber are located between the gripper members as shown in Figs. 1 and 3, and this inrush of air around the body of the fowl pulls the feathers in between the gripping surfaces.

A bag 93 is tied over outlet 88D of the fan casing by the string 93A. As the gripper surfaces move apart and release the feathers, as above described, the fan blows them into the bag 93. The discharge 88D of the fan casing is oblique as shown, in order to hold the bag open.

The second embodiment of my invention is generally similar to the first embodiment, the difference being in the details of the grippers and the flexible joints. In the second embodiment, the gripper discs 71 and 62 are eliminated, each set of rolling surfaces has two grips instead of four, the gripping surfaces are smooth instead of being corrugated, and the intermediate rolls and tightener rolls are driven from the gripper sleeves through the flexible joints.

In Figs. 9 and 10, the gripper roll or sleeve 95 corresponds to sleeve 66. The intermediate roll 96 corresponds to member 68. Hub 94 has four pins or projections 94C, 94D, 94E and 94F projecting therefrom. Forked arms 95D and 95F project from roll 95 and said arms respectively engage pins 94D and 94F. Forked arms 96C and 96E project from roll 96 and said arms respectively engage pins 94C and 94E. Central projections 95G and 96G extend from rolls 95 and 96 respectively, and they abut and guide hub 94 so as to make the plane in which the axes of said four pins are located, always bisect the angle between the shafts of the rolls 95 and 96. Hence the rolls 95 and 96 rotate, so that a constant nearly constant-speed drive is provided. Either roll can be the driver and it can drive in either direction.

In Figure 11, there is shown a modification equivalent to omitting one of the tines of each of the forks of Figures 9 and 10. The projection 195F of Figure 11 engages and drives the pin 94F, and the projections 195D, 196D and 196E correspond respectively to the forks 95D, 96C and 96E of Figures 9 and 10.

In Figs. 12–14, 195 may be the driving roll or driving gripper sleeve, 196 is the intermediate driven roll, 194 is the hub, and 194C, 194D, 194E and 194F are pins or projections of said hub. 195D and 195F are the driving arms projecting from gripper sleeve 195 and engaging projections 194D and 194F, and 196C and 196E are the driven arms projecting from intermediate roll 196 and engaging projections 194C and 194E, as shown in Fig. 11. The members 195B and 196B of Fig. 12 correspond to the abutting end-portions of the members 95 and 96.

The projections 194C, 194D, 194E and 194F are cylindrical where they respectively engage the driving and driven arms, just like the pins shown in Fig. 11, and although their opposite sides extend outwardly for strength and to hold screws 97, this produces a drive which approximates constant speed sufficiently for the purpose. The hub is made of three parts comprising the large disc-like member 94 and the two similar parts 194A and 194B which are located around spherical-headed bolts 95E and 96A, so that elements of the joint can move relative to each other in all directions. The two joints are similar with these two differences: First, disc 71 of Fig. 6 is eliminated from Fig. 12, and instead, smooth cone-shaped gripper flange 195B bears directly against smooth cone-shaped gripper flange 196B and grips the feathers therebetween. Second, the uncorrugated gripper flanges do not act as drive members. Instead, driving member 195 drives driven member 196 through the driving arms 195D and 195F, the driven arms 196C and 196E, and the hub 194 with its projections 194C, 194D, 194E and 194F as just described. The gripper flanges 195B and 196B are equal cones having a common apex at O', and, at constant speed, they roll together without slip. The gripper flange 195B, which is driven in unison with the member 195, is rigidly secured to said member 195. The gripper member 196B is a circumferential member which is rigidly secured to the driven roll 196. Said member 196B is provided with oppositely facing conical gripping surfaces. The right surface, as shown in Fig. 12, faces the conical surfaces of the member 195B and coacts with said conical surface of the member 195B, to grip feathers therebetween. The roll 195 is thus provided with two diametrically opposite fixed driving arms 195D and 195F, and the roll 196 is provided with two diametrically opposite arms 196C and 196E, which are driven by the roll 195, and in turn drive the gripper roll (not shown) at the left of roll 196. The roll 195 is provided with two diametrically opposite recesses. One of these recesses is indicated by the reference numeral 95H. Each of these recesses of the roll 195 receives the corresponding end of one of the driving arms 196C and 196E. Each of the arms 195D, 195F, 196C and 196E engages its corresponding recess only in the upper part of its circular motion.

It will be understood that my poultry plucker can be made in many forms and arrangements, and still come within the spirit of my invention. Therefore, I claim the invention broadly and do not limit myself to the forms and embodiments herein described and illustrated, but only by the following claims.

While I have shown frusto-conical plucking and gripping surfaces, and while I prefer to use frusto-conical surfaces instead of complete conical surfaces, it is to be understood that whenever I refer to frusto-conical, either in the description or in the claims, I generally include all tapered members which can have line rolling contact or rolling contact along small surfaces which are produced when tapered members are pressed against each other. The contacting plucking members may be made of resilient metal or have other suitable resilient construction in order to permit limited surface contact which is also a substantially true rolling contact.

In the embodiment shown in Fig. 6, the plucking members have coacting drive means at their adjacent faces, in order to drive said plucking members in unison. The same applies to the construction illustrated in Figs. 9–14.

Referring to Fig. 4, the spring 26 may be designated as an end-thrust spring because it exerts a force having a substantial component which is parallel to the axis of the adjacent plucking member.

I claim:

1. A plucking device comprising turnable frusto-conical members mounted to have line rolling-contact, the adjacent surfaces of said members having longitudinal corrugations, the hills of the corrugations of one member consecutively abutting the bottoms of the grooves of associated corrugations of the other member when said members are turned in unison, each hill having a lateral wall and each groove having a lateral wall, the lateral wall of each hill being spaced from the lateral wall of the associated groove when each hill abuts the bottom of the respective groove.

2. Plucking mechanism comprising a plurality of spaced plucking units, each unit having turnable frusto-conical plucking members mounted so that their adjacent surfaces have line rolling-contact, driving means adapted to drive the tops of the surfaces of said frusto-conical members in the same direction along a predetermined line, said surfaces of the plucking members of consecutive units having plucking zones which are offset along said line and also in a direction lateral to said line.

3. A plucking unit comprising at least three turnable frusto-conical members mounted to have line rolling-contact, the axis of one of said frusto-conical members being substantially horizontal, and the axes of the associated frusto-conical members being upwardly inclined.

4. A plucking unit comprising at least three turnable frusto-conical members mounted to have line rolling-contact, the axis of one of said frusto-conical members being substantially horizontal, the axes of the associated frusto-conical members being upwardly inclined, and all the axes of said frusto-conical members being substantially in the same plane.

5. A plucking unit comprising a plurality of frusto-conical rolls mounted turnably end-to-end, the adjacent ends of said rolls having line rolling-contact, said rolls having substantially constant-speed driving means at their adjacent ends, and resilient means adapted to press the surfaces of adjacent rolls against each other.

6. A plucking unit comprising a plurality of frusto-conical rolls mounted turnably end-to-end, the adjacent ends of said rolls having line rolling-contact, said rolls having substantially constant-speed driving means at their adjacent ends, resilient means adapted to press the surfaces of adjacent rolls against each other, and plucking bars located adjacent the respective lines of contact of said rolls.

7. A poultry plucking device comprising at least three frusto-conical rolls mounted end-to-end and having line rolling-contact, the adjacent ends of said rolls being connected by a joint which is yieldable in all directions, the adjacent ends of said rolls having means adapted to drive them at substantially the same speed, and resilient means adapted to press the adjacent surfaces of said rolls against each other.

8. A plucking device comprising a plurality of plucking members having adjacent plucking surfaces, each said plucking surface having corrugations so as to form consecutive hills and grooves, each said groove having an inner wall and also having a lateral wall, each said hill also having a lateral wall, said plucking members being mounted and said hills and corrugations being shaped so that the hills of each said surface consecutively enter associated grooves of the other surface when the plucking members are turned in unison, the outer end of the hill which enters an associated recess then abutting the inner wall of the associated recess and the lateral wall of said hill then being spaced from the lateral wall of the associated recess.

9. Plucking mechanism comprising a plurality of plucking units, each unit having a plurality of turnable frusto-conical plucking members shaped and mounted so that the adjacent portions of their surfaces have rolling-contact along a predetermined line, said respective lines of contact of the respective units being substantially perpendicular to another predetermined line, the plucking members of the respective units being driven so that the tops of their surfaces turn in the same direction, the tops of their surfaces being consecutively located at higher levels, said adjacent portions of said surfaces being shaped to operate as plucking surfaces.

JOHN W. KITTREDGE.